United States Patent
Fürst

(10) Patent No.: US 6,201,333 B1
(45) Date of Patent: Mar. 13, 2001

(54) METHOD FOR PRODUCING CONDUCTOR BARS AND STATOR WINDING FOR AN ELECTRIC MACHINE

(75) Inventor: Karl-Heinz Fürst, Ludwigshafen (DE)

(73) Assignee: ABB Patent GmbH, Mannheim (DE)

( * ) Notice: Subject to any disclaimer, the term of this patent is extended or adjusted under 35 U.S.C. 154(b) by 0 days.

(21) Appl. No.: 09/237,693

(22) Filed: Jan. 26, 1999

(30) Foreign Application Priority Data

Jan. 26, 1998 (DE) .............................................. 198 02 759

(51) Int. Cl.⁷ ....................................................... H02K 3/14
(52) U.S. Cl. ............................. 310/201; 310/195; 174/33
(58) Field of Search ................................... 310/201, 213, 310/195, 208; 174/33, 34

(56) References Cited

U.S. PATENT DOCUMENTS

| | | | | |
|---|---|---|---|---|
| 1,144,252 | * | 6/1915 | Roebel | 310/201 |
| 3,252,117 | * | 5/1966 | Fischer | 310/201 |
| 3,614,497 | * | 10/1971 | Brenner | 310/213 |
| 4,633,115 | * | 12/1986 | Saitoh et al. | 310/213 |
| 4,959,575 | * | 9/1990 | Saitoh et al. | 310/213 |
| 5,258,680 | * | 11/1993 | Takahashi et al. | 310/213 |

FOREIGN PATENT DOCUMENTS

| | | | | |
|---|---|---|---|---|
| 245520 | * | 8/1947 | (CH) | 310/201 |
| 1020723 | * | 12/1957 | (DE) | 310/213 |
| 866595 | * | 4/1961 | (GB) | 310/201 |
| 176491 | * | 9/1961 | (SE) | H02J/21/53 |
| 97/09766 | * | 3/1997 | (WO) | H02K/3/14 |

\* cited by examiner

Primary Examiner—Burton Mullins
(74) Attorney, Agent, or Firm—Herbert L. Lerner; Laurence A. Greenberg; Werner H. Stemer

(57) ABSTRACT

A conductor bar and a method for producing a conductor bar of a stator winding for an electric machine, in particular a generator, having a stator as well as a rotor disposed rotatably therein. Each conductor bar is formed of component conductors which are made from conductive material, are situated one above another in pairs, traverse a stack from a top layer obliquely to a bottom layer and each have uniform cranks in the vicinity of the top layer and in a bottom region. The cranks of each two component conductors placed one above another and assigned to one another in pairs are disposed offset in the longitudinal direction at a spacing relative to cranks of a succeeding or preceding pair of component conductor bars. The component conductors are disposed in two stacks located next to one another and laterally adjoining one another. The component conductors are each situated one above another in pairs and are each mutually interlocked through the use of the laterally neighboring component conductors. As a result, each conductor bar extends partially on the surface of the stator facing toward and away from the rotor. The cranks of the component conductors of a pair of conductors bars are disposed at a spacing from one another in the longitudinal direction so that an interspace is produced relative to the component conductor of the pair of conductor bars situated therebelow.

6 Claims, 1 Drawing Sheet

METHOD FOR PRODUCING CONDUCTOR BARS AND STATOR WINDING FOR AN ELECTRIC MACHINE

BACKGROUND OF THE INVENTION

Field of the Invention:

The invention relates to a method for producing a conductor bar of a stator winding for an electric machine, in particular a generator, with a stator as well as a rotor disposed rotatably therein. Each conductor bar is formed from component conductors which are made of conductive material, are situated one above another in pairs, traverse a stack from a top layer obliquely to a bottom layer and in each case have uniform cranks in the vicinity of the top layer and in a bottom region. The cranks of each two component conductors placed one above another and assigned to one another in pairs are disposed offset in the longitudinal direction at a spacing relative to cranks of a succeeding or preceding pair of component conductors. The component conductors are disposed in two stacks located next to one another and laterally adjoining one another. The component conductors are each situated one above another in pairs and in each case are mutually interlocked through the use of the laterally neighboring component conductors. As a result, each conductor bar extends partially on the surface of the stator facing toward and away from the rotor. The invention also relates to a conductor bar for such a stator winding which is produced according to the method.

It is known in the case of large electric machines, in particular of rotary machines such as motors or generators, which have a stator and a rotor rotatably disposed therein, for the windings disposed in the stator and in the rotor to be configured by using conductor bars with a large rectangular cross section made from electrically conducting material, such as copper.

In that structure, because of the large cross section per conductor bar required in each case, the individual conductor bars are formed from component conductors which are usually disposed in each case one behind another radially with interposed insulation in two stacks located next to one another.

In order to avoid, or at least to reduce an increase in resistance due to the displacement of current from the interior of the conductor to the surface thereof, the individual conductors are usually provided with uniform cranks which have the effect of causing each component conductor bar to run partly along the surface of the conductor.

In that regard, the word crank is understood as a double bending of the individual component conductor of a conductor bar which permits each individual conductor to be joined partly to the other component conductors inside the conductor bar in such a way that the component conductor runs alternately in one or the other, adjoining conductor stack. The individual component conductors are interlocked helically so that it can occur continuously. In that configuration, each component conductor runs in sections in the same relationship in the planes of the winding which is provided.

That possibility for reducing resistance has been successfully employed for a long time. However, it has now emerged that in the case of electrical machines of higher power, in which each conductor bar must have a relatively large current-carrying capacity, such interlocking or offsetting encounters limits of feasibility which can only be reached by a different dimensioning of the component conductors.

The result thereof, on one hand, is that when producing the component conductors for a conductor bar there is a specific need for space for the finished or offset component conductors, and that need results from the radius of curvature for the crank. On the other hand, the space available in the stator is insufficient for the volume required by the finished offset conductor bars. The consequence so far has been an increased outlay for production in order to nevertheless be able to install the conductor bars provided in the available space.

SUMMARY OF THE INVENTION

It is accordingly an object of the invention to provide a method for producing conductor bars and a stator winding for an electric machine having correspondingly produced conductor bars, which overcome the hereinafore-mentioned disadvantages of the heretofore-known methods and devices of this general type and in which the outlay for production is reduced without disadvantages for electrical functioning.

With the foregoing and other objects in view there is provided, in accordance with the invention, a method for producing conductor bars of a stator winding in an electric machine, in particular a generator, having a stator and a rotor rotatable therein, which comprises forming each conductor bar by placing component conductors made of conductive material one above another in pairs, traversing a stack from a top layer obliquely to a bottom layer and each having uniform cranks in the vicinity of the top layer and in a bottom region; offsetting the cranks of each two component conductors placed one above another and assigned to one another in pairs in longitudinal direction at a spacing relative to the cranks of a succeeding or preceding pair of component conductors; placing the component conductors in two stacks located next to one another and laterally adjoining one another; placing each of the component conductors one above another in pairs and mutually interlocked by laterally neighboring component conductors, causing each conductor bar to extend partially on a surface of the stator facing toward and away from the rotor; and locating the cranks of the component conductors of a pair of conductor bars at a spacing from one another in the longitudinal direction to produce an interspace relative to the component conductor of the pair of conductor bars disposed therebelow.

With the objects of the invention in view, there is also provided a stator winding for an electric machine, in particular a generator, having a stator and a rotor rotatable therein, the improvement comprising conductor bars formed of at least three component conductors made of conductive material; the component conductors disposed in two stacks laterally adjoining one another in two planes located radially one behind another; the component conductors having uniform periodic cranks disposed at a spacing; the component conductors mutually interlocked, with each conductor bar running alternately partially on a surface of the stator facing the rotor; and the cranks of the component conductors of one of the conductor bars disposed in longitudinal direction at a spacing from one another forming an interspace relative to the component conductor of the conductor bar of the next plane disposed therebelow. The interspace accommodates the changes to the cross section of the component conductors which are caused by repositioning of material during offsetting.

In other words, the offsetting or interlocking technique that is already known to date, in which it is ensured that the periodic cranks which are disposed at a defined axial spacing in each component conductor connect without a spacing at the neighboring component conductor, is abandoned in favor of a new offsetting technique. In the new offsetting technique spacings are deliberately provided between the cranks of the neighboring component conductors, that is to say those situated one on another and assigned to one another in pairs. These spacings which are provided according to the invention produce interspaces that are used in order to accommodate the component conductors with the radii of curvature required for the cranks, and with the local cross sectional thickening necessarily associated herewith. This is done without requiring an additional outlay, or the occurrence of undesired straining of the conductor package.

In contrast with initially existing objections that these interspaces could have a negative effect on the electrical properties of the relevant electric machine provided therewith, practical trials have shown that there is no problem in achieving the targeted increase in power through the use of the inventive structure of the conductor bars.

An inventive stator winding is consequently formed from conductor bars in which each conductor bar has at least three component conductors that are disposed in planes located radially one behind another. Each component conductor in this case has periodic double cranks disposed at a defined spacing. Each component conductor crank that is remote from the rotor is offset at the spacing "a" relative to an assigned crank of a neighboring component conductor of the same plane.

The cranks which are provided at a spacing from one another, in neighboring component conductors, permit the fixing of less closely spaced radii of curvature, thus reducing material stresses. Furthermore, in this way the previous problem of straightening operations and requisite reworking in order to achieve the required accuracy of fit is avoided. It is now easily possible with the aid of the inventive procedure to reliably meet the required close dimensional tolerances for the conductor packages.

In accordance with another feature of the invention, the cranks which are remote from the rotor are disposed at a spacing of a/3 from the corresponding crank of a neighboring component conductor of the same plane. This produces an interspace which serves, as it were, for tolerance compensation. In other words, the component conductors with relatively large cross sections and corresponding radii of curvature use this interspace.

In accordance with a further feature of the invention, insulating material such as, for example, insulating paper with which, inter alia, the component conductors are wrapped, is preferably disposed in the interspace. However, it may be advantageous in specific cases to additionally provide cast resin as the insulating material.

In accordance with a concomitant feature of the invention, the component conductors are disposed mutually offset by $\frac{2}{3}$ relative to the offsetting or interlocking length which is always equal. This means that neighboring component conductors of a plane in each case adjoin one another in accordance with two thirds of this section, while they diverge in the last third, that is to say they no longer bear against one another.

Other features which are considered as characteristic for the invention are set forth in the appended claims.

Although the invention is illustrated and described herein as embodied in a method for producing conductor bars and a stator winding for an electric machine, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
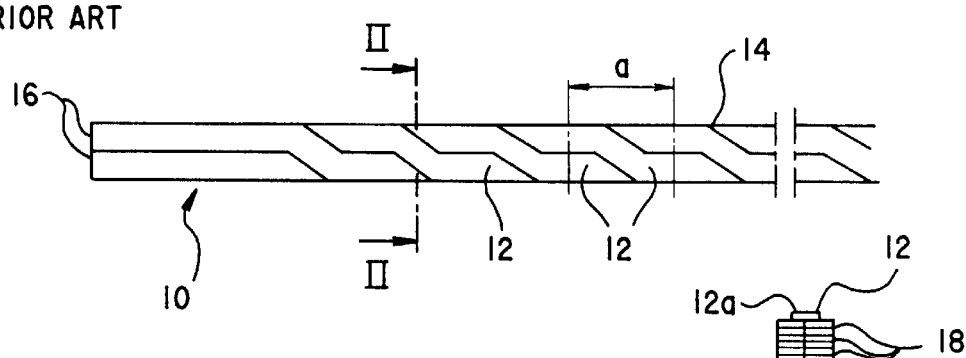
FIG. 1 is a fragmentary, diagrammatic, side-elevational view of a conventional prior art conductor bar, formed from offset component conductors.

Referring now to the figures of the drawings in detail and first, particularly, to FIG. 1 thereof, there is seen a conductor bar 10 which corresponds to the prior art and is formed from component conductors 12 that in each case have a crank 14 of approximately 45° at a specific spacing, which is, to be more accurate, constructed as a double crank.

The component conductors 12 are disposed in two stacks 16 located next to one another in layers 18, that is to say radially one behind another with reference to an installation situation in a relevant generator.

A specific pitch is provided relative to the length of the conductor bar 10 with regard to the cranks 14, that is to say there is a fixed spacing "a" between each two cranks of a conductor bar 10. That spacing "a" is equal for all of the component conductors 12. It follows therefrom that component conductors 12 neighboring one another also always adjoin one an other directly at the side, that is to say also in the region of the crank 14.

In the case of component conductors with cross sections larger than previously customary, the problem arises that the deformation thereof in the case of offsetting with the same bending angle of approximately 45° either leads to a greater space requirement or requires reworking which represents an additional outlay and consequently lengthens the production period.

Figure 2:
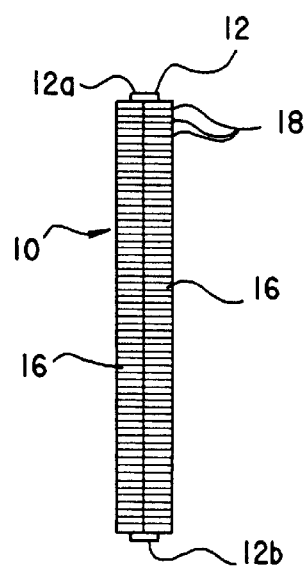
FIG. 2 is a cross-sectional view of the conductor bar according to FIG. 1, which is taken along a line II—II of FIG. 1, in the direction of the arrows.

FIG. 2 shows a cross section of that known conductor bar or rod 10 taken along a section line I—I in FIG. 1. That sectional representation makes it plain that a very high number of layers 18 is achieved per conductor rod 10. The component conductors 12 in each case change the stack 16 from layer 18 to layer 18. Two planes 12a and 12b can be seen located radially behind each other.

Figure 3:
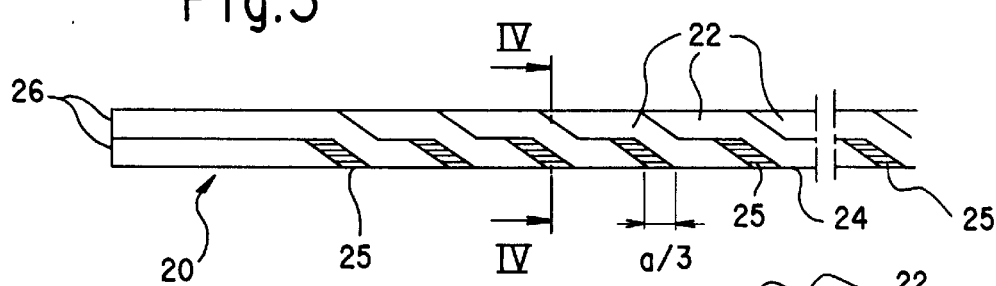
FIG. 3 is a fragmentary, side-elevational view of a conductor bar according to the invention, which is formed from offset component conductors.
Figure 5:
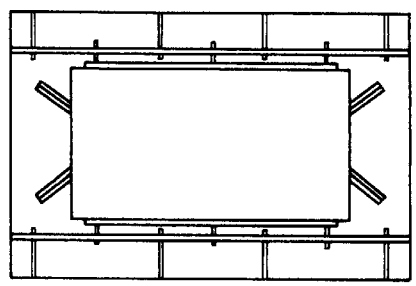
FIG. 5 is a cross-sectional view of a stator and a rotor on a reduced scale.

FIG. 3 shows an embodiment of a conductor bar 20 in accordance with the invention, which largely corresponds to the structure according to the prior art. Thus, the conductor bar 20 is likewise formed from two component conductors 22 assigned to one another in pairs and disposed in stacks 26 in layers 28 defining planes. The component conductors 22 likewise have cranks 24 and are interlocked with the preceding and succeeding component conductors 22. Each conductor bar 20 extends partially on a surface of a stator facing toward and away from a rotor, shown in FIG. 5.

However, in accordance with the invention, in the example shown, the individual component conductors 22 belonging to the conductor bar 20 of the invention are offset in such a way that there is a mutual axial spacing of a/3 between each two cranks 24. In other words, the component conductors assigned to one another in pairs are mutually offset axially, with the result that a respectively lower component conductor 22 is visible over a length of a/3.

This offsetting of the component conductors of a pair of component conductors of a conductor bar 20 produces an interspace with an axial extent corresponding to the offset which is available as a tolerance zone for the respective crank 24. As a result, it is possible, in accordance with the invention, for conductor bars 20 formed from two or more mutually assigned individual component conductors 22 to be accommodated in a respective conductor slot without an additional space requirement.

This is based on the fact that local changes in cross section caused by the offsetting of the component conductors 22 and resulting from repositionings of material are accommodated by the interspace, which is, in principle, exactly as large as the part of the respective lower component conductor 22 which is rendered visible by the offset and serves as a tolerance zone.

The remaining space of the interspace produced by the axial offset of the component conductors is preferably filled with insulating material 25.

The provision of this tolerance zone according to the invention which is produced by the offset of the component conductors 22 and is preferably a/3 in length, is fully sufficient on one hand to achieve the required degree of filling of the non-illustrated conductor slots, and on the other hand to avoid an increased outlay for reworking. Despite an increased material cross section of the component conductors 22, the remaining previous bending parameters can be attained through the use of the three-dimensional spacing set up by this measure.

Figure 4:
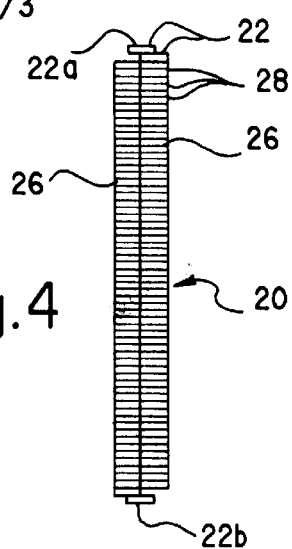
FIG. 4 is a cross-sectional view of the conductor bar according to FIG. 3, which is taken along a line IV—IV of FIG. 3, in the direction of the arrows.

Referring to FIG. 4, two planes 22a and 22b can be seen located radially behind each other.

I claim:

1. In a method for producing conductor bars of a stator winding in an electric machine having a stator and a rotor rotatable therein, the improvement which comprises:

forming each conductor bar by placing component conductors made of conductive material one above another in pairs, traversing a stack from a top layer obliquely to a bottom layer and each having uniform cranks in the vicinity of the top layer and in a bottom region;

offsetting the cranks of each two component conductors placed one above another and assigned to one another in pairs in longitudinal direction at a spacing relative to the cranks of a succeeding or preceding pair of component conductors;

placing the component conductors in two stacks located next to one another and laterally adjoining one another;

placing each of the component conductors one above another in pairs and mutually interlocked by laterally neighboring component conductors, causing each conductor bar to extend partially on a surface of the stator facing toward and away from the rotor; and locating the cranks of the component conductors of a pair of conductor bars at a spacing from one another in the longitudinal direction to produce an interspace relative to the component conductor of the pair of conductor bars disposed therebelow.

2. In a stator winding for an electric machine having a stator and a rotor rotatable therein, the improvement comprising:

conductor bars formed of at least three component conductors made of conductive material;

said component conductors disposed in two stacks laterally adjoining one another in two planes located radially one behind another;

said component conductors having uniform periodic cranks disposed at a spacing;

said component conductors mutually interlocked, with each conductor bar running alternately partially on a surface of the stator facing the rotor; and said cranks of said component conductors of one of said conductor bars disposed in longitudinal direction at a spacing from one another forming an interspace relative to said component conductor of said conductor bar of the next plane disposed therebelow.

3. The stator winding according to claim 2, wherein said spacing between said cranks of two of said component conductors assigned to one another in pairs is between a/5 and a/2.

4. The stator winding according to claim 2, wherein said spacing between said cranks of two of said component conductors assigned to one another in pairs is a/3.

5. The stator winding according to claim 3, including insulating material disposed in said interspace.

6. The stator winding according to claim 2, wherein said component conductors are offset by ⅔ relative to one another.

* * * * *